United States Patent [19]

Schiering

[11] Patent Number: 4,841,386
[45] Date of Patent: Jun. 20, 1989

[54] CASSETTE RECORDER WITH RECORDING PROGRAMMING

[75] Inventor: Rolf Schiering, Hemmingen, Fed. Rep. of Germany

[73] Assignee: Deutsche AG für Unterhaltungeselectronic OHG, Villingen-Schwenningen, Fed. Rep. of Germany

[21] Appl. No.: 117,066
[22] PCT Filed: Feb. 13, 1987
[86] PCT No.: PCT/EP87/00073
§ 371 Date: Sep. 11, 1987
§ 102(e) Date: Sep. 11, 1987
[87] PCT Pub. No.: WO87/05129
PCT Pub. Date: Aug. 27, 1987

[30] Foreign Application Priority Data

Feb. 21, 1986 [DE] Fed. Rep. of Germany ....... 3605563

[51] Int. Cl.⁴ ..................... G11B 15/07; G11B 23/087
[52] U.S. Cl. ........................................ 360/69; 360/132
[58] Field of Search .................................. 360/132, 69

[56] References Cited

U.S. PATENT DOCUMENTS 4,338,644  7/1982  Staar .................................. 360/132
4,554,599 11/1985 Shiozaki ............................. 360/132
4,641,203  2/1987  Miller ................................. 360/132
4,723,181  2/1988  Hickok ............................... 360/132

FOREIGN PATENT DOCUMENTS 0042600  6/1981  European Pat. Off. .
0134917  6/1984  European Pat. Off. .
2445520  4/1976  Fed. Rep. of Germany .
2757264  7/1979  Fed. Rep. of Germany .
2901575  7/1980  Fed. Rep. of Germany .
3314783 10/1984 Fed. Rep. of Germany .
3402375  7/1985  Fed. Rep. of Germany .
2118135  2/1983  United Kingdom .

OTHER PUBLICATIONS

Patent Abstracts of Japan, 1 and 7, Nr. 51 (P-179) (1196) 26. Feb. 1983 & JP, A, 57199983 (Nippon Victor K.K.) 8. Dec. 1982.

Primary Examiner—Robert S. Tupper
Attorney, Agent, or Firm—Spencer & Frank

[57] ABSTRACT

The invention concerns a cassette recorder with recordable programming. According to the invention the programming to be recorded is selected by the user who marks a table that is attached to the cassette housing and this marked table indicates for example, the day, the time and the channel of the show to be recorded.

13 Claims, 2 Drawing Sheets

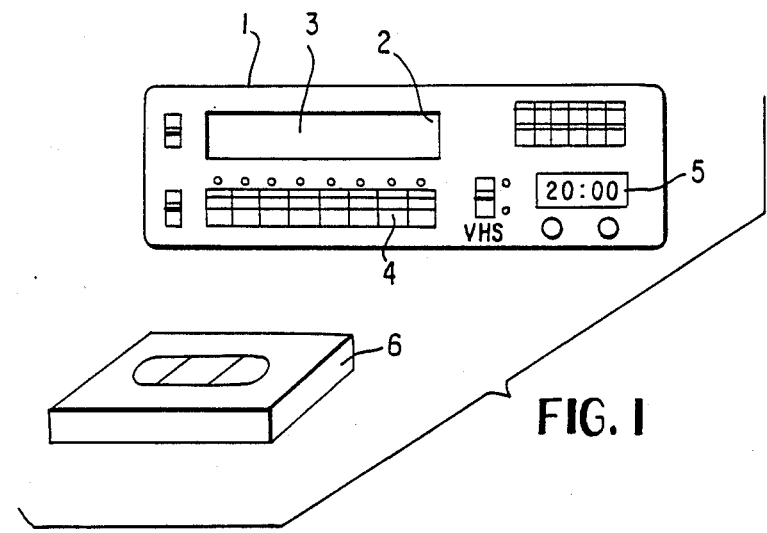
FIG. 1
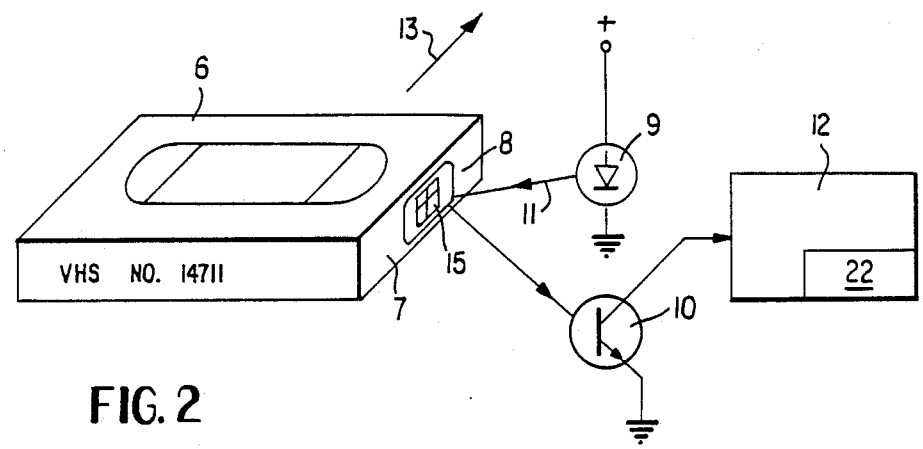
FIG. 2
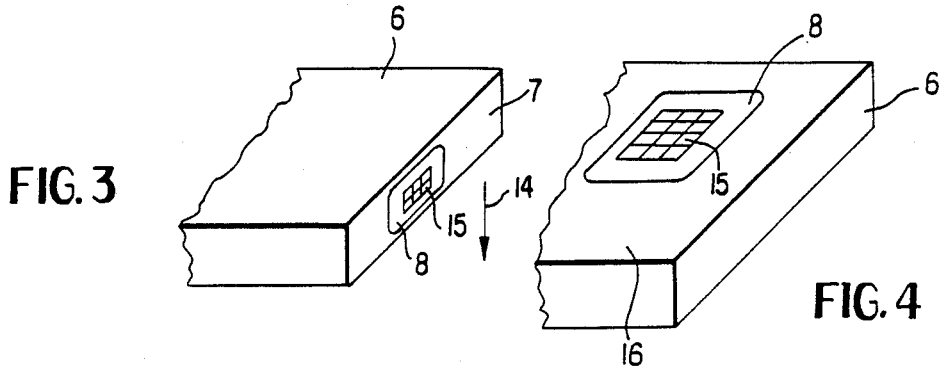
FIG. 3
FIG. 4

FIG. 5

| DAY | | 1 | 2 | ■ | VPS yes □ | | | no ■ | | |
|---|---|---|---|---|---|---|---|---|---|---|
| | ■ | 2 | 3 | 4 | 5 | 6 | 7 | 8 | 9 | 0 |
| MONTH | 1 | ■ | 3 | 4 | 5 | 6 | 7 | 8 | 9 | 0 |
| START | 1 | 2 | ■ | 4 | 5 | | | | | |
| MIN | 1 | 2 | 3 | 4 | 5 | 6 | 7 | 8 | 9 | ■ |
| START | ■ | 2 | | | | | | | | |
| HR | 1 | 2 | 3 | 4 | 5 | 6 | 7 | 8 | ■ | 0 |
| DURATION | 1 | 2 | ■ | 4 | 5 | | | | | |
| MIN | 1 | 2 | 3 | 4 | 5 | 6 | 7 | 8 | 9 | ■ |
| HR | 1 | 2 | 3 | 4 | 5 | | | | | |
| CHANNEL | ■ | 2 | 3 | 4 | 5 | 6 | | | | |
| | 1 | 2 | ■ | 4 | 5 | 6 | 7 | 8 | 9 | 0 |

FIG. 6

| COUNTRY | ■ | 2 | 3 | 4 | 5 | | | | | |
|---|---|---|---|---|---|---|---|---|---|---|
| | 1 | 2 | ■ | 4 | 5 | 6 | 7 | 8 | 9 | 0 |
| PROGRAM | ■ | 2 | 3 | 4 | 5 | 6 | | | | |
| SOURCE | 1 | 2 | 3 | 4 | 5 | ■ | 7 | 8 | 9 | 0 |

CASSETTE RECORDER WITH RECORDING PROGRAMMING

BACKGROUND OF THE INVENTION

1. Field of the Invention

The invention concerns a cassette recorder which can record programming automatically after storing data such as the day of the week, the time and the channel.

2. Discussion of the Prior Art

DE-OS No. 33 14 783.3 discloses a videorecorder, in which the cassette is equipped with a bar code that is concerned with various parameters of the cassette, such as the tape length. The bar code is read with an opto-electronic reading device, arranged in fixed location in the recorder, so that it can utilize the movement of the cassette into play-back position for the reading process.

SUMMARY OF THE INVENTION

The object of the present invention is to simplify an input into a video recorder.

The above and other objects are accomplished by the invention in which a cassette recorder and a cassette are used for selectively automatically recording programs based on parameters that have been selected by a user. The cassette comprises a housing having a dedicated area thereon for a user to mark indicia representing parameters to be read by the recorder so that selected programs can be automatically recorded. The cassette recorder includes a reading means for reading the indicia on the cassette and control means for receiving a signal indicative of the indicia and storing it in a memory so that the control means can trigger automatic recording of the selected programs.

BRIEF DESCRIPTION OF THE DRAWINGS

The invention may be better understood by referring to the detailed description of the invention when taken in conjunction with accompanying drawings in which:

FIG. 1 illustrates schematically the housing of a videorecorder with the cassette not yet inserted;

FIG. 2 illustrates schematically the cooperation of the cassette with the opto-electronic reading device;

FIG. 3 illustrates schematically a different arrangement of the table on the cassette for a videorecorder which operates somewhat differently;

FIG. 4 illustrates a further location of the table on the cassette;

FIG. 5 illustrates a markable table on the label; and

FIG. 6 illustrates a modification of the markable table.

DESCRIPTION OF THE PREFERRED EMBODIMENTS

FIG. 1 shows a videorecorder 1 with an opening 2 that is closed by a flap 3 that is pivotable around a horizontal axis. On the front side of the recorder 1, a plurality of control and indicator elements 4 as well as a numerical display 5 for the indication of tape length and time of day are located. The videocassette 6 is horizontally insertable by hand into the opening 2 in the videorecorder 1. As the videocassette 6 is placed into the opening 2, the flap 3 is swung open. The videocassette 6 is grasped by a transport device automatically set into operation so that the videocassette 6 is transported first in the horizontal direction and then in vertical direction down into the play-back position. Such a videorecorder having a front loader with elevator is described in more detail in DE-OS 30 31 690.

According to FIG. 2, the videocassette 6 is provided with a label 8 on the housing's outer wall 7. A table 15 is arranged on the label 8. An opto-electronic reading device with a photodiode 9 and a phototransistor 10 is located within the videorecorder 1. For scanning, the photodiode 9 sends a light beam 11 to the label 8 having the table 15; the beam is modulated according to the table 15 and is reflected so that it reaches the phototransistor 10. The phototransistor 10 then supplies the read-out signal to the control 12. The table 15 contains a plurality of parameters for recording according to real time or VPS data (VPS=video program system) or for the videocassette 6; these data are evaluated in the control 12 and serve to control various functions in the videorecorder. The control 12 works as an automatic recording device and controls the pickup and the recording of transmissions. The control 12 also controls, for instance, the electronic counter for the numerical display 5 of the tape position, a change-over corresponding to the type of the videocassette tape, the starting or change-over of equalizing circuits corresponding to a prior distortion of the signal recorded by the videocassette 6, or further parameters described in the introductory portion of this specification. The control 12 has a memory 22 in which the parameters of the table 15 are stored. The automatic recording device switches the recorder 1 to start recording at the desired and marked time and therefore the recorder 1 records the desired broadcast. The reading process using the opto-electronic reading device 9,10 takes place automatically by the described defined movement of the videocassette 6 in direction 13 within the videorecorder 1. For the reading process, the movement in horizontal direction as well as the movement in vertical direction can be utilized. One or more reading devices 9,10 for the scanning of several columns and/or rows of a table 15 are attached in a fixed location in the videorecorder 1. For the utilization of the vertical movement of the videocassette, the label 8 with the table 15 is accordingly attached so that it is oriented in the vertical direction on an outer wall 7 of the cassette 6.

In FIG. 3, the table 15 is oriented in the vertical direction on the wall 7. This arrangement is advantageous for videorecorders into which the cassette 6 is inserted manually in direction 14 into the cassette receptacle of the videorecorder.

In the embodiments, the reading device is arranged in fixed location in the recorder, and the reading process results from the movement of the cassette. It is also possible to read the table of the cassette in the stationary state of the cassette by means of a moving reading device. Thereby the reading device can be automatically put into motion during or after the insertion of the cassette. The reading device can also be arranged on a lid, which is manually activated after the insertion of the cassette into the cassette receptacle and thus executes a relative motion with respect to the stationary cassette.

FIG. 4 shows the label 8 with the table 15 on the upper surface 16 of the cassette 6.

FIG. 5 shows the label 8 with the table 15 for sticking onto a videocassette. The parameters 17 of the table 15 on the label 8 are manually markable with a pen. This means that a user colors the desired numbers dark and thereby produces the marked parameters 18. With the marked parameters 18, the control 12 can be programmed in order to record a show automatically. The recording of the programming by the videorecorder takes place through an input via control elements or via the marking of the parameters 17,18 shown on the label 8. Advantageously the label 8 is washable and hence reusable. The VPS is described in the "Funkschau," No. 25/1985, in the article "Flexibel programmieren mit VPS" [Flexible Programming By Means Of VPS] on pages 47 to 51 and in the ARD/ZDF/ZVEI guidelines "Video-Programm-System (VPS)," edited by the Arbeitsgemeinschaft der öffentlich-rechtlichen Rundfunkanstalten der Bundesrepublik Deutschland [Association of Public Broadcasting Stations of the Federal Republic of Germany], dated Dec. 4, 1984. The broadcasting show, "Dinner for one," which is broadcast on New Year's Eve at 19:30 h, is stored in the videorecorder as follows by means of the table 15: For New Year's Eve, the 31st is to be checked and colored dark, respectively, that means, in the first line the 3, in the second line the 1. For the month, the 1 in the third line and the 2 in the fourth line produce the 12. The broadcast time is given in hours and minutes with the darkening of the 1 in the seventh line, the 9 in the eighth line, the 3 in the fifth line and the 0 in the sixth line for 19:30 h. In the first line, it can also be indicated whether the recording should be made with or without VPS. If it is recorded without evaluation of the VPS data indicated by the sender (no VPS is checked), the duration of a broadcast is marked in lines 9 to 11, for instance, for a 30 minute broadcast the 3 in the 9th line and the 0 in the 10th line, are marked while nothing is marked in the 11th line. The recorder would therefore be switched on for a time period (duration) of 0 hours (11th line) and 30 minutes (9th and 10th line). If the broadcast is recorded with VPS data, the VPS parameter is marked yes; then a marking in lines 9 to 11 is not registered. The last two lines characterize the channel selector. The tuner of a videorecorder has several, for instance, 8, 16, 32 or 60, channel selectors. The tuner is tuned to the regional stations by means of the channel selector. The optoelectronic reading device 9,10 recognizes the darkly marked parameters 18, i.e., the darkly marked 1 in the 12th line and the darkly marked 3 in the 13th line. The channel 13 is selected with lines 12 and 13 of the table 15. If the tuner tunes itself (station search run) an input according to country and program source is possible. FIG. 6 shows an input possibility according to country and program source, which can stand in place of the channel selection lines 12 and 13. The numbers 1 and 3 in lines 12 and 13 of FIG. 6 stand for 13, hexadecimal D, for the Federal Republic of Germany (see page 16 of the ZVEI guidelines). In the lines 14 and 15, the 1 and 6 are darkly colored. The program source 16 is thus marked for the NDR-I/tristate broadcast, that is the states of Hamburg, Lower Saxony, and Schleswig-Holstein. An automatic tuner looks for a station worthy of reception, which transmits the tristate broadcast. The recorder then records the show indicated on the table 15. The evaluation circuit controls the videorecorder so that the show "Dinner for one," which is provided with VPS data by the station, is recorded. By means of the VPS data, which are arranged in the 16th line of a transmitted video signal, the recorder can unambiguously identify a program source by means of a table, for instance, a PROM (Programmable Read Only Memory).

I claim:

1. A receiver cassette recorder and, for use therewith, a cassette for selectively automatically recording programming based on parameters that have been selected by a user, said cassette comprising a cassette housing having thereon a dedicated area for a user to mark indicia representing parameters to be read by said recorder so that selected programs can be automatically recorded; and said cassette recorder comprising:

reading means for reading indicia on said cassette; and control means connected to said reading means for receiving a signal indicative of the indicia read by said reading means, and said control means including a memory connected to said control means for storing the signals received by said control means.

2. The combination as defined in claim 1, wherein said dedicated area includes a table disposed on said cassette housing which can be marked by the user.

3. The combination as defined in claim 2, wherein said table has an erasable surface so that any markings made on said table can be erased.

4. The combination as defined in claim 2, wherein said reading means includes an opto-electronic device and the table can be marked with a pen.

5. The combination as defined in claim 2, further comprising a label disposed on said cassette housing and said label includes said table thereon.

6. The combination as defined in claim 1, wherein said cassette is a video cassette and said receiver cassette recorder is a video recorder.

7. The combination as defined in claim 6, wherein said table is preprinted on said label.

8. A cassette for use in a receiver cassette recorder comprising a cassette housing having thereon a dedicated area for a user to mark indicia representing parameters to be read by the recorder so that selected programs can be automatically recorded.

9. A cassette as defined in claim 8, wherein said dedicated area includes a table disposed on said cassette housing which can be marked by the user.

10. A cassette as defined in claim 8, wherein said cassette is a video cassette.

11. A receiver cassette recorder for use with a cassette which can be marked by a user with various indicia representing parameters defining which programs to be automatically recorded, said recorder comprising:

reading means for reading indicia on the cassette; and control means connected to said reading means for receiving a signal indicative of the indicia read by said reading means, said control means including a memory for storing the signals received by said control means so that said control means can trigger automatic recording of the selected programs.

12. A cassette recorder as defined in claim 11, wherein said reading means includes an opto-electronic device.

13. A cassette recorder as defined in claim 11, wherein said recorder is a video cassette recorder.

* * * * *